United States Patent
Purchase

(10) Patent No.: US 7,312,858 B2
(45) Date of Patent: Dec. 25, 2007

(54) POLARIZATION DEPENDENCY IDENTIFICATION

(75) Inventor: Ken G. Purchase, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 11/024,264

(22) Filed: Dec. 27, 2004

(65) Prior Publication Data

US 2006/0139625 A1    Jun. 29, 2006

(51) Int. Cl.
*G01N 21/00* (2006.01)
(52) U.S. Cl. ..................................... 356/73.1
(58) Field of Classification Search ............... None
See application file for complete search history.

(56) References Cited

U.S. PATENT DOCUMENTS

| | | | |
|---|---|---|---|
| 6,552,782 B2 | 4/2003 | Colbourne et al. | |
| 6,879,749 B2* | 4/2005 | Wong et al. | 385/24 |
| 7,068,372 B1* | 6/2006 | Trisnadi et al. | 356/450 |

OTHER PUBLICATIONS

Gandluru, M., "Optical Networking and Dense Wavelength Division Multiplexing (DWDM)," [online], modified Nov. 24, 1999, [retrieved on Feb. 7, 2000], retrieved from the Internet at <URL: http://www.cis.ohio-state.edu/~jain/cis788-99/op_dwdm/index.html>, 20 pp.
Harrison, D. "Mach-Zehnder Interferometer," [online], 1999, [retrieved on Oct. 10, 2007], retrieved from the Internet at <URL: http://www.upscale.utoronto.ca/GeneralInterest/Harrison/MachZehnder/MachZehnder.html>, 2 pp.
Paniccia, M., V. Krutul, & S. Koehl, "Introducing Intel's Advances in Silicon Photonics," Intel White Paper, Feb. 2004; 5 pp.
Saito, T., T. Ota, T. Toratani, and Y. Ono, "16-ch Arrayed Waveguide Grating Module with 100-GHz Spacing," Furukawa Review, No. 19, 2000, pp. 47-52.

\* cited by examiner

*Primary Examiner*—Tu T Nguyen
(74) *Attorney, Agent, or Firm*—Konrad, Raynes & Victor, LLP

(57) ABSTRACT

Provided are a method, system, and device for passing a plurality of light beams though an array of waveguides wherein at least one waveguide is coupled to a test structure which exhibits an insertion loss dependent on a known polarization. For each of a plurality of adjacent waveguides of the array including the one waveguide, a first wavelength response associated with a first polarization, and a second wavelength response associated with a second polarization, may be measured. In one example, polarization may be identified as the known polarization if the peak value of one wavelength response of the test structure is less than the peak value of another wavelength response of the first test structure. In one embodiment, unknown polarizations in the polarization response of an optical component having multiple correlated outputs may be identified. Other embodiments are described and claimed.

32 Claims, 7 Drawing Sheets

POLARIZATION DEPENDENCY IDENTIFICATION

BACKGROUND

Optical networks are increasingly being used in many industries, most notably telecommunications and computer networks. Such networks use light as an optical signal to transmit data, typically over a glass fiber. For example, a laser can create a beam of light onto which a modulator encodes data to form an optical signal. The light may be transported via a fiber optic cable to a destination of interest. Fibers often carry multiple wavelengths or bands of wavelengths of light simultaneously—each one encoded with its own data stream. These wavelengths can be combined by a device called a multiplexer and placed on the fiber. For example, Dense Wavelength Division Multiplexing (DWDM) is a fiber-optic transmission technique which permits multiplexing many optical signals of different wavelengths onto a single fiber.

On the receiving end, the laser light is typically demultiplexed, that is, split into individual optical signals by wavelength or band of wavelengths. Each optical signal is often routed to a separate photodetector, which converts the optical signal into an electric signal, which can then be routed to host logic for processing. Thus a glass fiber may accommodate many optical channels, each channel carrying an optical signal which may be separated from the other optical signals of the fiber and processed. Optical networks may also use other items such as mirrors, splitters, and switches to manipulate the light, or add or drop an optical signal at various locations.

One device which can facilitate Dense Wavelength Division Multiplexing is an arrayed waveguide grating (AWG) module that is capable of handling multiple wavelengths. An AWG is typically based on planar lightwave circuit (PLC) technology suitable for mass production. Modules can be relatively thin, such as less than 10 mm and may be sealed in a package.

FIG. 1 shows a schematic diagram of a known AWG demultiplexer 10 which is formed on a substrate 12. A beam of light represented by arrow 14, comprises a plurality of multiplexed optical signals which are carried on a plurality of wavelengths $\lambda 1, \lambda 2 \ldots \lambda n$. The beam 14 is applied to an input waveguide of an array 16 of input waveguides of the AWG demultiplexer 10 which carries the beam to an input slab waveguide 18. The beam 14 is diffracted into the input slab waveguide 18 which spreads the optical signals of the beam 14. The spread optical signals are input to a plurality of inputs 20 of an array 22 of waveguides 24, each of which propagates an input optical signal along the length of the particular waveguide 24, to an output 26.

Typically, the waveguides 24 are arranged in the array 22 so that the length from input 20 to the associated output 26 for each waveguide 24, differs from the adjacent waveguide 24 by a length differential, such as, d1. As a consequence, a phase offset corresponding to the length differential d1 may be imposed on the optical signal being propagated by a particular waveguide 22, relative to the phase of the optical signal propagated by an adjacent waveguide 24.

The optical signals passing through the array 22 of waveguides 24, are again spread by diffraction by an output slab waveguide 30 coupled to the arrayed waveguide outputs 26. However, due to the mutual interference between the optical signals from each waveguide 24, caused by the phase difference between adjacent optical signals, the wavefronts of the optical signals may be diffracted in a substantially uniform direction as a function of the wavelength of the optical signals. Accordingly the optical signals of a common wavelength can be focused at substantially the same position at the output side 32 of the output slab waveguide 30. An input 34 of a waveguide 36 may be positioned at each output position of the output slab waveguide 30. Thus, the optical signals of differing wavelengths can be focused at different positions 34 on the output side 32 of the output slab waveguide 30 to permit each optical signal to be sent to a different output waveguide 36 of an array 38 of output waveguides, as a function of wavelength. In this manner, the optical output signals carried by wavelengths $\lambda 1, \lambda 2 \ldots \lambda n$ may be demultiplexed, that is, extracted from the mulitplexed optical input signal 14.

The AWG demultiplexer 10 may also be operated as a multiplexer. A plurality of input optical signals as represented by the wavelengths $\lambda 1, \lambda 2 \ldots \lambda n$ may be input into the associated waveguides 36. The AWG operated in reverse, combines the various optical signals into a multiplexed beam which is output from one of the waveguides 16.

The operation of an AWG may be temperature dependent. Accordingly, an AWG device may include a temperature control element to facilitate achieving an appropriate multiplexing or demultiplexing function.

Each waveguide 36 provides a separate output channel O1, O2 . . . On. The quantity of light passing through each output channel may be measured as a function of wavelength and polarization. Known devices for measuring light output as a function of wavelength include the JDS Uniphase SWS. FIG. 2 shows a schematic example of the wavelength response of a known AWG for each of a plurality of output channels O1, O2 . . . On. Thus, for example, the response of the AWG demultiplexer 10 to a particular light beam with a particular polarization at output channel O1 has a peak indicated at 40 at a particular wavelength of the input light beam.

Many AWG's have a polarization dependent wavelength response (PDW), that is, the wavelength at which the peak response occurs may differ, depending upon the polarization of the light beam. One known polarization is referred to as transverse electric (TE) in which the electric field vector is normal to the direction of propagation. Thus, in fiber optics, a polarized beam having a TE polarization has an electric field vector that passes through the optical axis of an optical fiber. Conversely, a polarization referred to as transverse magnetic (TM) is one in which the magnetic field vector is normal to the direction of propagation. Thus, in fiber optics, a polarized beam having a TM polarization has a magnetic field vector that passes through the optical axis of an optical fiber. When AWG's are measured using the JDS Uniphase SWS system, the response is measured as a function of the polarizations that provide maximum and minimum loss, which are not necessarily TE and TM. However it is frequently assumed that the measured polarizations of maximum and minimum loss are TE and TM (although which of these has maximum loss and which has minimum is often not known). This assumption is approximately true in many cases.

In FIG. 2, a polarization dependent wavelength response for a light beam having a first polarization is represented by a solid line. The polarization dependent wavelength response for a light beam having a second polarization, different from the first polarization, is represented by a dashed line. Thus, for example, the response of the AWG demultiplexer 10 to a light beam having the first polarization at output channel O1 has a peak indicated at 40 at a particular wavelength of the input light beam. The response of the AWG demultiplexer 10 to a light beam having the second polarization at output channel O1 has a peak indicated at 42 at a particular wavelength of the input light beam.

As indicated in FIG. 2, the peak responses for a light beam having one polarization may be at a somewhat lower wavelength than the peak response for a light beam having a different polarization. In measuring these polarization dependent responses, many instruments may not readily provide sufficient information to determine which polarization, TE or TM or some combination thereof, resulted in the response having the lower (or higher) peak wavelength. One known technique for identifying the polarizations of the polarization dependent responses is to provide as an input a light beam having a known polarization.

DETAILED DESCRIPTION

In the following description, reference is made to the accompanying drawings which form a part hereof and which illustrate several embodiments. It is understood that other embodiments may be utilized and structural and operational changes may be made without departing from the scope of the embodiments.

Figure 3:
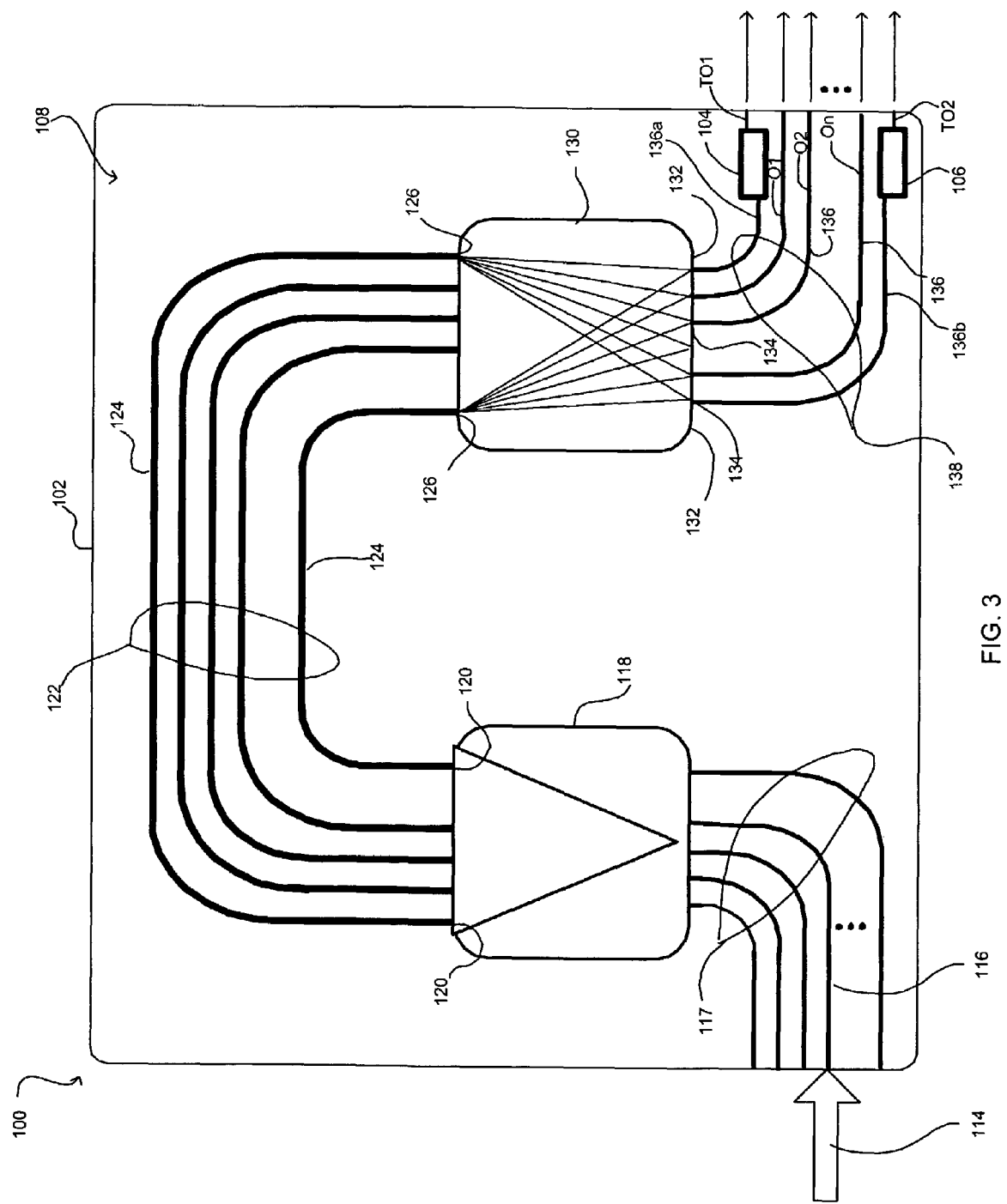
FIG. 3 illustrates an embodiment of an optical networking device in accordance with the present description.

FIG. 3 shows an example of an optical networking device 100 formed on a substrate 102, and having a polarization dependent wavelength response for which the polarization associated with a response may be readily identified. In one application, the polarizations may be identified without knowing in advance the polarizations of the input light beams. As explained in greater detail below, the device 100 has one or more test structures 104, 106 each of which, in one embodiment, exhibits an insertion loss with a known polarization dependence. As a consequence, the polarization associated with a response may be identified.

In the illustrated embodiment, the optical networking device 100 includes an AWG indicated generally at 108. It is appreciated that features as described herein may be utilized in other optical networking devices, both those presently known and those devices developed in the future.

Figure 4:
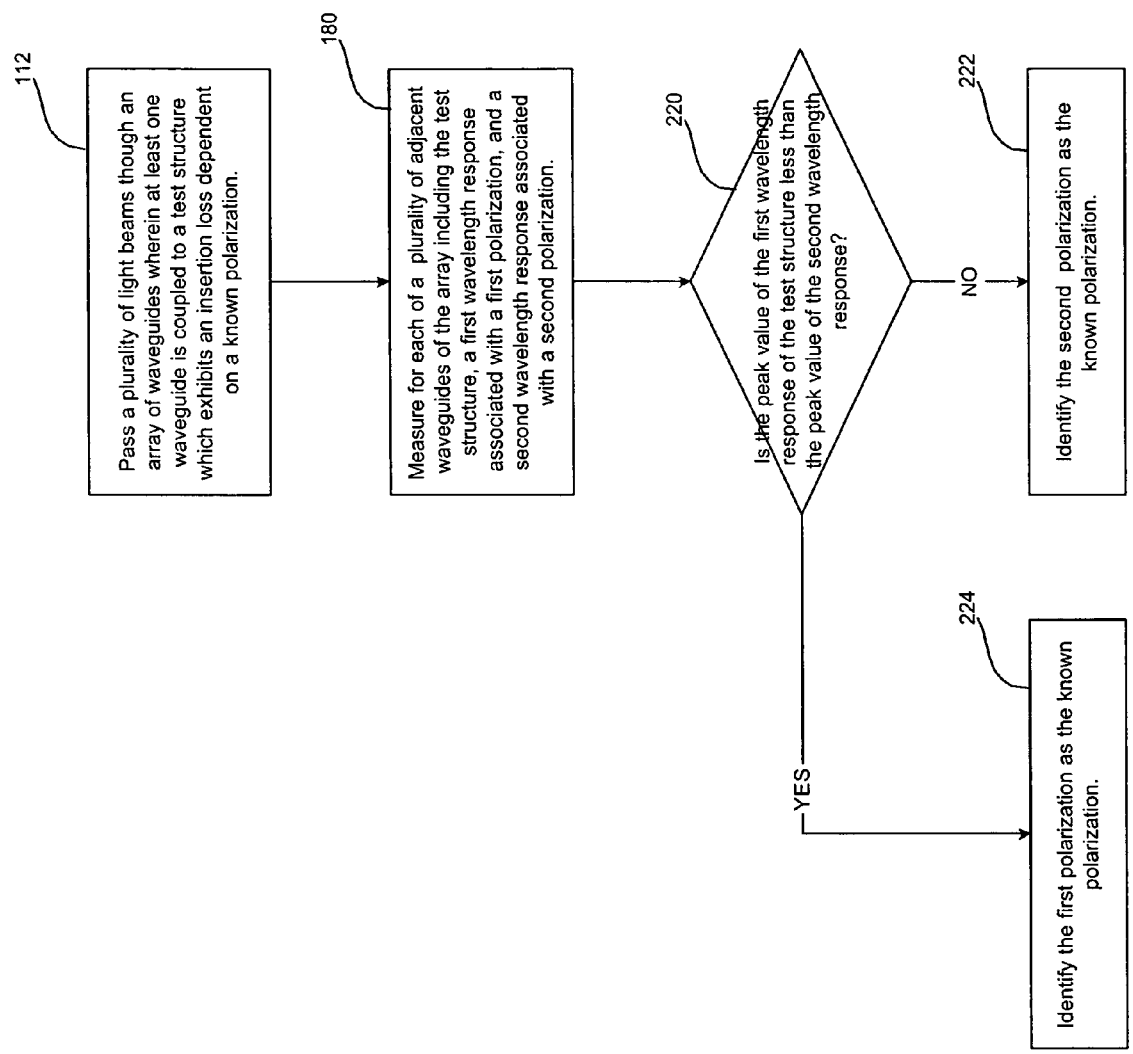
FIG. 4 illustrate an embodiment of operations utilizing the optical networking device of FIG. 3.

FIG. 4 shows an example of operations involving the device 100. As an optical networking device, the device 100 is suitable for use in an optical network such as that indicated generally at 110 in FIG. 5.

In one operation, a plurality of light beams are passed (block 112, FIG. 4) though an array of waveguides wherein at least one waveguide is coupled to a test structure which exhibits an insertion loss dependent on a known polarization. In the illustrated embodiment, a beam of light represented by arrow 114, comprises a plurality of multiplexed optical signals which are carried on a plurality of wavelengths or bands of wavelengths $\lambda 1, \lambda 2 \ldots \lambda n$. In a manner similar to that of the conventional AWG 10, the beam 114 is applied to one input waveguide 116 of an array 117 of input waveguides 116 of the AWG 108 which carries the beam to an input slab waveguide 118. The beam 114 is diffracted at the input slab waveguide 118 which spreads the optical signals of the beam 114. The spread optical signals are input to a plurality of inputs 120 of an array 122 of waveguides 124, each of which propagates an input optical signal along the length of the particular waveguide 124, to an output 126.

The waveguides 124 are arranged in the array 122 so that the length from input 120 to the associated output 126 for each waveguide 124, differs from the adjacent waveguide 124 by a length differential, such as, d1. As a consequence, a phase offset corresponding to the length differential d1 may be imposed on the optical signal being propagated by a particular waveguide 122, relative to the phase of the optical signal propagated by an adjacent waveguide 124.

The optical signals passing through the array 122 of waveguides 124, are again spread by diffraction into an output slab waveguide 130 coupled to the arrayed waveguide outputs 126. However, due to the mutual interference between the optical signals from each waveguide 124, caused by the phase difference between adjacent optical signals, the wavefronts of the optical signals may be diffracted in a substantially uniform direction as a function of the wavelength of the optical signals. Accordingly the optical signals of a common wavelength can be focused at substantially the same position at the output side 132 of the output slab waveguide 130.

An input 134 of a waveguide 136 of an array 140 may be positioned at each output position of the output slab waveguide 130. Thus, the optical signals of differing wavelengths can be focused at different positions on the output side 132 of the output slab waveguide 130 to permit each optical signal to be sent to a different output waveguide 136 of an array 138 of waveguides, as a function of wavelength. In this manner, the optical output signals carried on wavelengths $\lambda 1, \lambda 2 \ldots \lambda n$ may be demultiplexed, that is, extracted from the mulitplexed optical input signal 114, and output at an output channel O1, O2 . . . On.

In accordance with one aspect of the description provided herein, one of the output waveguides 136a of the array 138 may be coupled to the input of a test structure 104 which exhibits an insertion loss dependent on a known polarization at a test output channel TO1. Another test structure 106 which also exhibits an insertion loss dependent on a known polarization, is coupled to another output waveguide 136b of the array 138. The output channel of the test structure 106 is indicated as TO2 in FIG. 3.

In one embodiment, the test structures 104, 106 may each include a directional coupler. In another embodiment, each test structure 104, 106 may include a mach-zehnder interferometer. It is appreciated that other structures exhibiting an insertion loss dependent on a known polarization may be utilized as well for test structures 104, 106. It is further appreciated that in some applications, a single test structure may be utilized. In other applications, the more than two test structures may be provided. It is further appreciated that, depending upon the particular application, the test structures 104, 106 may be the same or different types of structures.

In the illustrated embodiment, the waveguide 136a to which the test structure 104 is coupled, is positioned at an extreme end of the array 138 of waveguides 136. Similarly, the waveguide 136*b* to which the test structure 106 is coupled, is positioned at the other extreme end of the array 138 of waveguides 136. It is appreciated that the test structures 104, 106 may be coupled to other waveguides, depending upon the particular application. For example, test structures may be provided for one or more of the waveguides 116 of the array 117.

Figure 6:
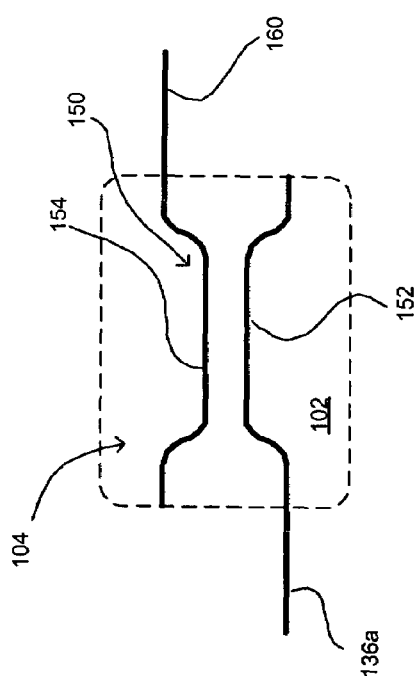
FIG. 6 illustrates an embodiment of a test structure of the optical networking device of FIG. 3.

FIG. 6 is a schematic diagram showing the test structure 104 in greater detail. The test structure 106 may be constructed in a similar manner. The test structure 104 of the illustrated embodiment includes a directional coupler 150 comprising a first waveguide 152 and a second waveguide 154 adjacent the first waveguide 152. The details of the construction of the directional coupler will vary, depending upon the particular application. It is appreciated that a number of directional couplers, including those known to those skilled in the art, may be suitable. The test structure 104 is disposed on the same substrate 102 as the AWG 108 (FIG. 3). The output channel TO1 of the second waveguide 154 is carried by an output waveguide 160.

Figure 7:
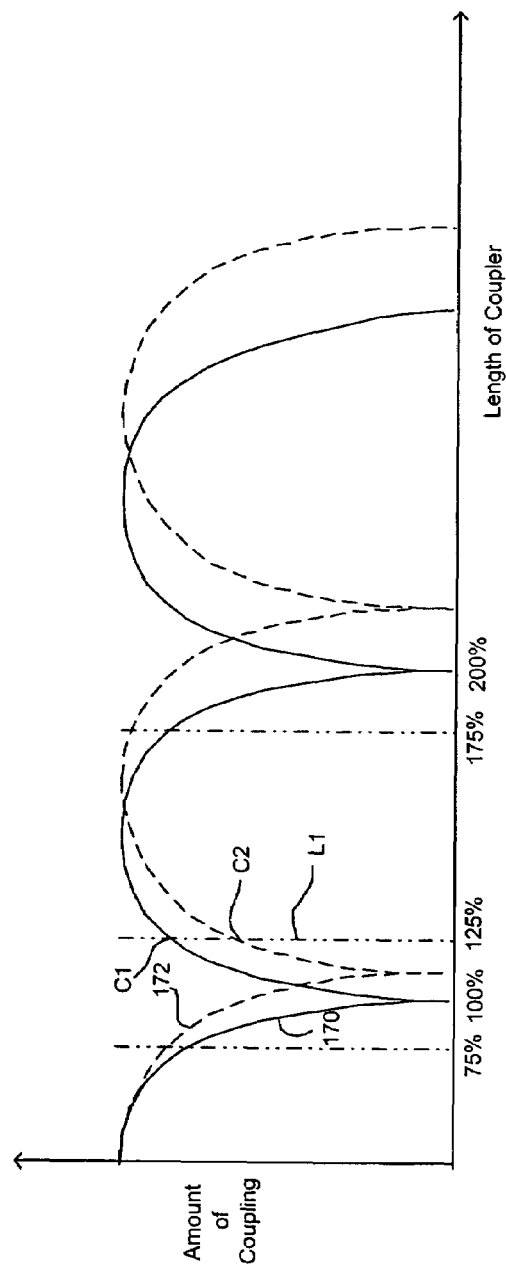
FIG. 7 illustrates a polarization dependent loss, expressed in logarithmic units (dB) as a function of coupler length for the test structure of FIG. 6.

In the illustrated embodiment, a light beam input through the waveguide 136*a* to the waveguide 152, will be coupled over to the waveguide 154 as a function of the length of the directional coupler 150 and as a function of the polarization of the input light beam. FIG. 7 shows one example of such a coupling. In the example of FIG. 7, the amount of coupling is represented by logarithmic curves plotted as a function of coupler length expressed in terms of a percentage. One curve, indicated at 170, has a first minimum at a coupler length denoted 100%, a second minimum at 200% et cetera. The curve 170 is produced by a light beam having a known polarization such as TE, for example.

Superimposed with the curve 170 is a second curve 172 representing the amount of coupling for a light beam having another polarization, the TM polarization, in this example. At a particular coupler length, such as 125%, for example, it is indicated that the amount of coupling between the first and second waveguides, 150, 152 is at a first value C1 for a light beam having the TE polarization. At the same physical length, as represented by line L1, the amount of coupling between the first and second waveguides, 152, 154 is at a second, lower value C2 for a light beam having the TM polarization. Hence, at this length, the coupling of the directional coupler 150 exhibits a relative insertion loss if the input light beam has a TM polarization instead of a TE polarization, in this example.

The particular polarization which results in a relative insertion loss depends upon the particular length of the coupler chosen as well as other factors known to those skilled in the art including the materials from which the waveguides are constructed, the dimensions, doping of materials etc. Thus, physical lengths corresponding to the 75%, 125%, 225% lengths as well as other lengths may be selected, depending upon the particular application.

Figure 1:
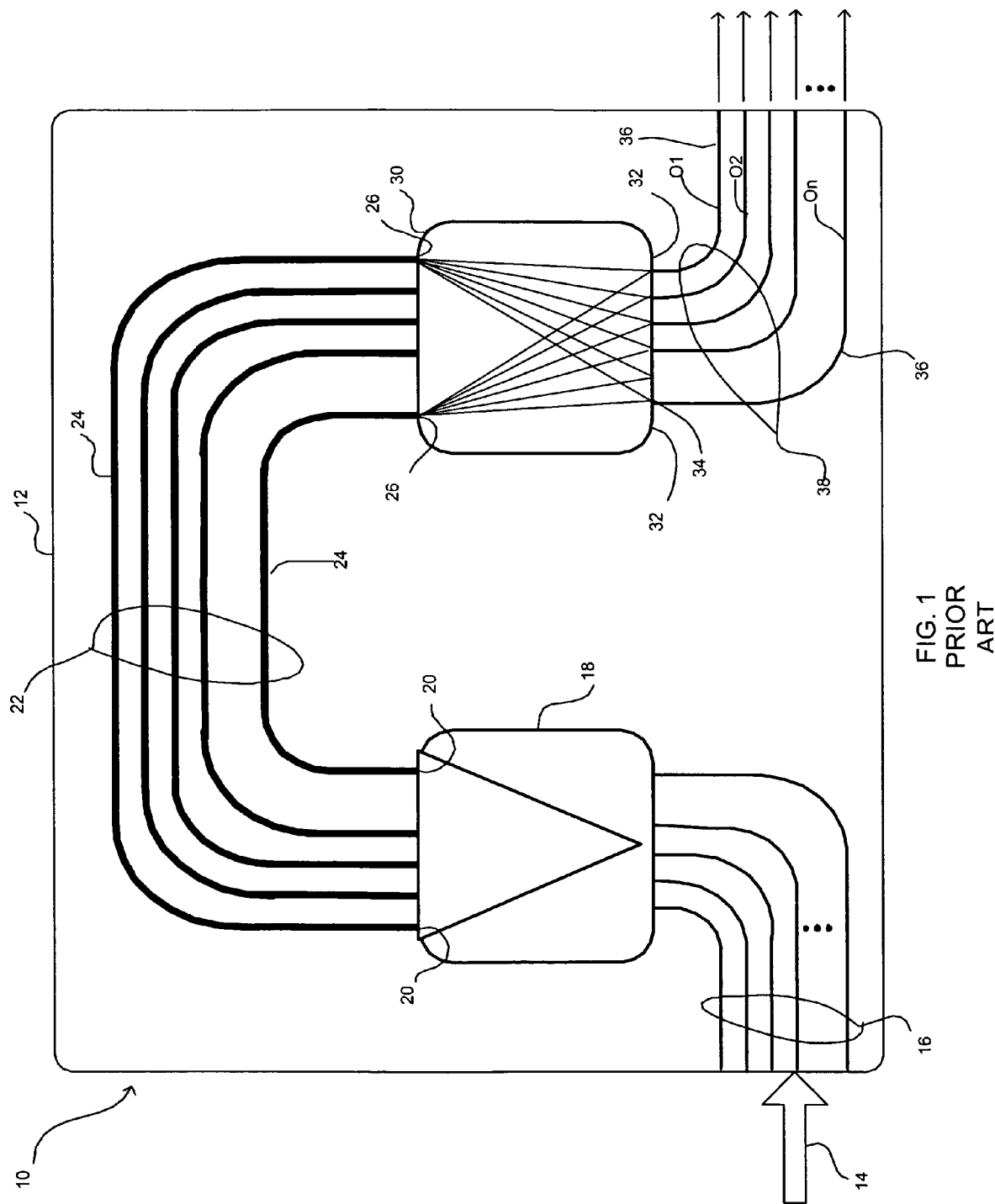
FIG. 1 illustrates a prior art arrayed waveguide grating.
Figure 2:
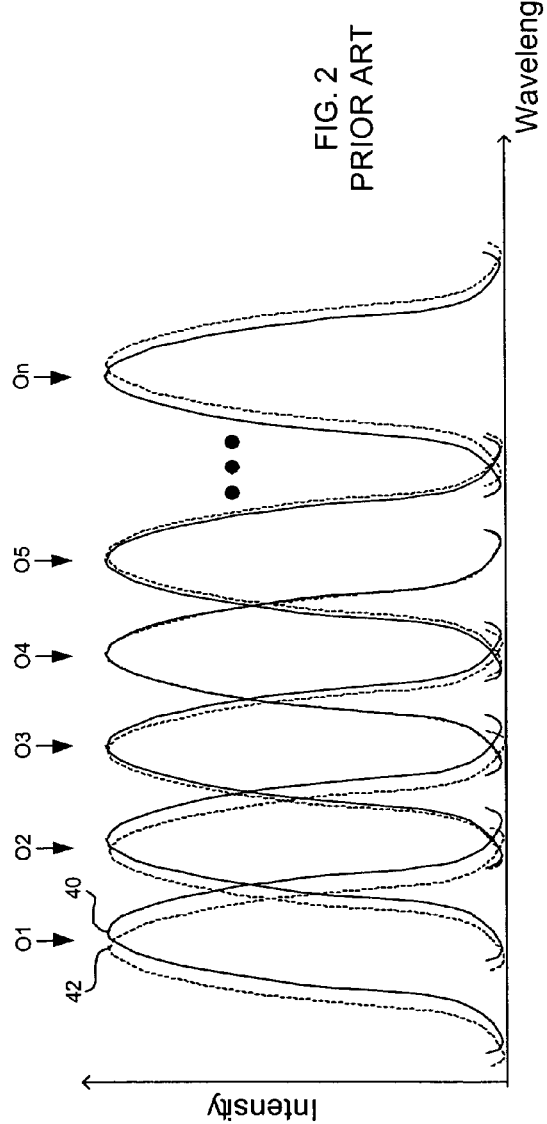
FIG. 2 illustrates polarization dependent wavelength responses for the arrayed waveguide grating of FIG. 1.
Figure 8:
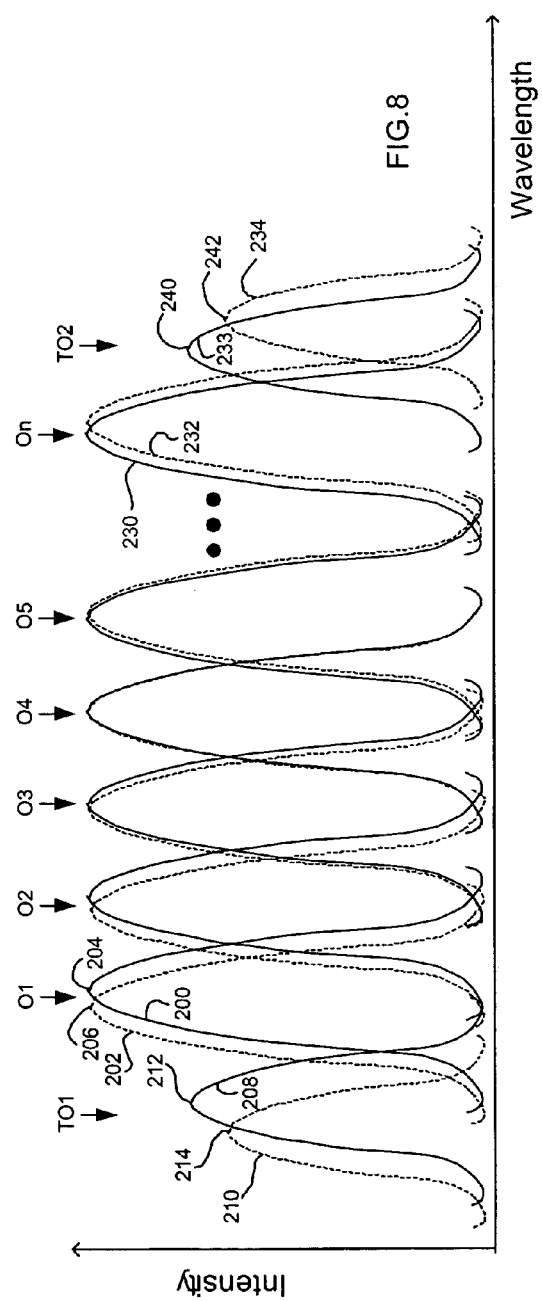
FIG. 8 illustrates polarization dependent wavelength responses for the optical networking device of FIG. 3.

In one operation of the device 100 (FIG. 3), a measurement (block 180, FIG. 4) may be made for each of a first plurality of adjacent waveguides, a first wavelength response associated with a first polarization, and a second wavelength response associated with a second polarization. FIG. 8 shows one example of a measured wavelength response for a light beam having a first polarization, represented by a solid line 200. The polarization dependent wavelength response for a light beam having a second polarization, different from the first polarization, is represented by a dashed line 202. Thus, for example, the response of the device 100 to a light beam having the first polarization at output channel O1 has a peak indicated at 204 at a particular wavelength of the input light beam. The response of the device 100 to a light beam having the second polarization at output channel O1 has a peak indicated at 206 at a particular wavelength of the input light beam.

In this example, the measured wavelength response for a light beam having the same first polarization is represented by a solid line for each output channel O1, O2 . . . On, and test output channels TO1, TO2. Conversely, the measured-wavelength response for a light beam having the same second polarization is represented by a dashed line for each output channel O1, O2 . . . On and test output channels TO1, TO2.

As indicated in FIG. 8, the peak responses of adjacent output channels O1, O2 and O3, for example, for a light beam having the second polarization may be at a somewhat lower wavelength than the peak responses of adjacent output channels O1, O2 and O3, for a light beam having the first polarization. In accordance with one aspect of the present description, one of the adjacent waveguides being measured may include a test structure such as the test structure 104. FIG. 8 shows one example of a measured wavelength response of the test channel output TO1 for a light beam having the first polarization, which is represented by a solid line 208. The polarization which produced the response 208 represented by a solid line is the substantially the same as the polarization which produced the response 200 of the adjacent output channel O1.

The polarization dependent wavelength response of the test channel TO1 for a light beam having the second polarization, is represented by a dashed line 210. The polarization which produced the response 210 represented by the dashed line is substantially the same as the polarization which produced the response 202 of the adjacent output channel O1.

In this example, the wavelength response 208 at test output TO1 has a peak indicated at 212 at a particular wavelength of the input light beam. The response of the device 100 to a light beam having the second polarization at output channel TO1 has a peak indicated at 214 at a lower wavelength of the input light beam. Thus, the peak responses of the test output channel TO1, like the adjacent output channels O1, O2 and O3, for a light beam having the second polarization may be at a somewhat lower wavelength than the peak responses the test output channel TO1, like the adjacent output channels O1, O2 and O3, for a light beam having the second polarization.

In another operation of the device 100, a determination is made (block 220) as to whether the peak value of the wavelength response of the test structure for the first polarization is less than the peak value of the second wavelength response of the test structure for the second polarization. As previously mentioned, the test structure 104 exhibits an insertion loss dependent on a known polarization. In the example of FIG. 8, this insertion loss is indicated by the peak 214 of the wavelength response 210 of the test channel output TO1 for the second polarization being lower (having greater insertion loss) than the peak 212 of the wavelength response 208 of the test channel output TO1 for the first polarization. In the example of FIG. 7, if the test structure 104 has a length of 125%, the polarization which exhibits the greater insertion loss is the TM polarization as indicated by the response represented by the dashed line 172 at C2. Hence, the second polarization may be identified (block 222) as the TM polarization in the example of FIGS. 7, 8 for a test structure length of 125%. Conversely, if the test structure 104 exhibited a greater insertion loss for the TE polarization, the second polarization may be identified (block 224) as the TE polarization. It is appreciated that other test structure coupler lengths may be selected as well.

As another example, FIG. 8 indicates the peak responses of adjacent output channels O5 . . . On, for example, for a light beam having the second polarization, may be at a somewhat higher wavelength than the peak responses of adjacent output channels O5 . . . On, for a light beam having the first polarization. In accordance with one aspect of the present description, one of the adjacent waveguides being measured may include a test structure such as the test structure 106. FIG. 8 shows one example of a measured wavelength response of the test channel output TO2 for a light beam having the first polarization, which is represented by a solid line 233. The polarization which produced the response 233 which is represented by a solid line, is substantially the same polarization which produced the response 230 of the adjacent output channel On.

The polarization dependent wavelength response of the test channel TO2 for a light beam having the second polarization, is represented by a dashed line 234. The polarization which produced the response 234 represented by the dashed line, is substantially the same polarization which produced the response 232 of the adjacent output channel On.

In this example, the wavelength response 233 at test output TO2 has a peak indicated at 240 at a particular wavelength of the input light beam. The response 234 of the device 100 to a light beam having the second polarization at output channel TO2 has a peak indicated at 242 at a higher wavelength of the input light beam. Thus, the peak responses of the test output channel TO2, like the adjacent output channels O5 . . . On, for a light beam having the second polarization, may be at a somewhat higher wavelength than the peak responses of the test output channel TO2, like the adjacent output channels O5 . . . On for a light beam having the first polarization.

In one operation of the device 100, a determination is made (block 220) as to whether the peak value of the wavelength response of the test structure for the first polarization is less than the peak value of the second wavelength response of the test structure for the second polarization. As previously mentioned, the test structure 106 exhibits an insertion loss dependent on a known polarization. In the example of FIG. 8, this insertion loss is indicated by the peak 242 of the wavelength response 234 of the test channel output TO2 for the second polarization being lower (having greater insertion loss) than the peak 240 of the wavelength response 233 of the test channel output TO2 for the first polarization.

In this example, the test structure 106 exhibits the same polarization dependent insertion loss as the test structure 104 as shown in FIG. 7. Hence, in the example of FIG. 7, if the test structure 106 has a length of 125%, the polarization which exhibits the insertion loss is the TM polarization as indicated by the response represented by the dashed line 172 at C2. Hence, the second polarization may be identified (block 222) as the TM polarization in the example of FIGS. 7, 8 for a test structure length of 125%. It is appreciated that other test structure coupler lengths may be selected for the test structure 106 as well.

The device 100 may be fabricated in accordance with known planar lightwave circuit techniques. In one embodiment, the device 100 including the array 116 of input waveguides, array 140 of output waveguides and test structures 104, 106 may be fabricated on a single monolithic substrate 102. The substrate 102 and other components may be fabricated of a variety of materials including silicon, gallium arsenide and indium phosphide. For example, the substrate 102 may be fabricated as a silicon substrate and the waveguides as silica-based cladding and core. It is appreciated that in other embodiments, the elements of the device 100 may be fabricated using other techniques and may incorporate additional substrates.

In one application, a determination of the identity of the polarization associated with a particular wavelength dependent response may be utilized to refine a fabrication technique to achieve a particular result. For example, in one application, fabrication processes may be modified to shift a wavelength dependent response of one or another polarization to reduce or eliminate a polarization dependency of the responses of the device 100. In another application, fabrication processes may be modified to shift a wavelength dependent response to enhance a polarization dependency, depending upon the particular application. Techniques for fabricating planar lightwave circuits are known to those skilled in the art.

Figure 5:
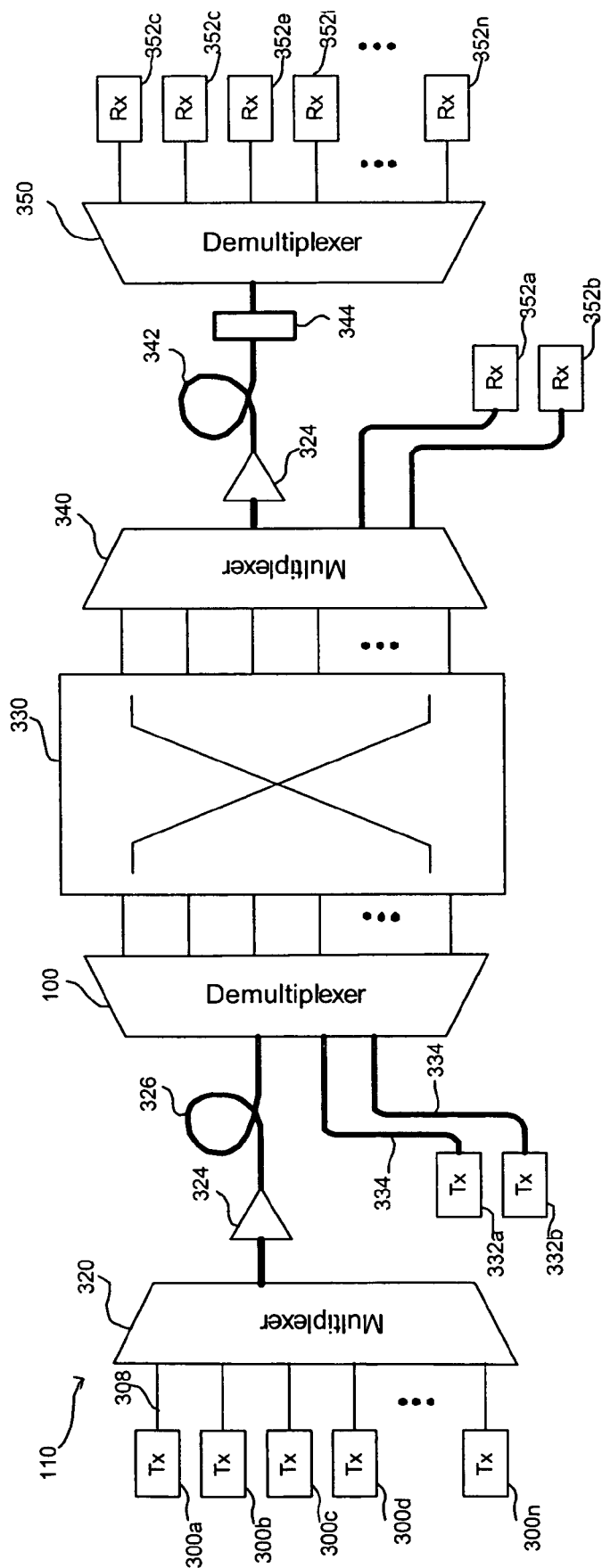
FIG. 5 illustrates an embodiment of an optical network utilizing the optical networking device of FIG. 3.
Figure 9:
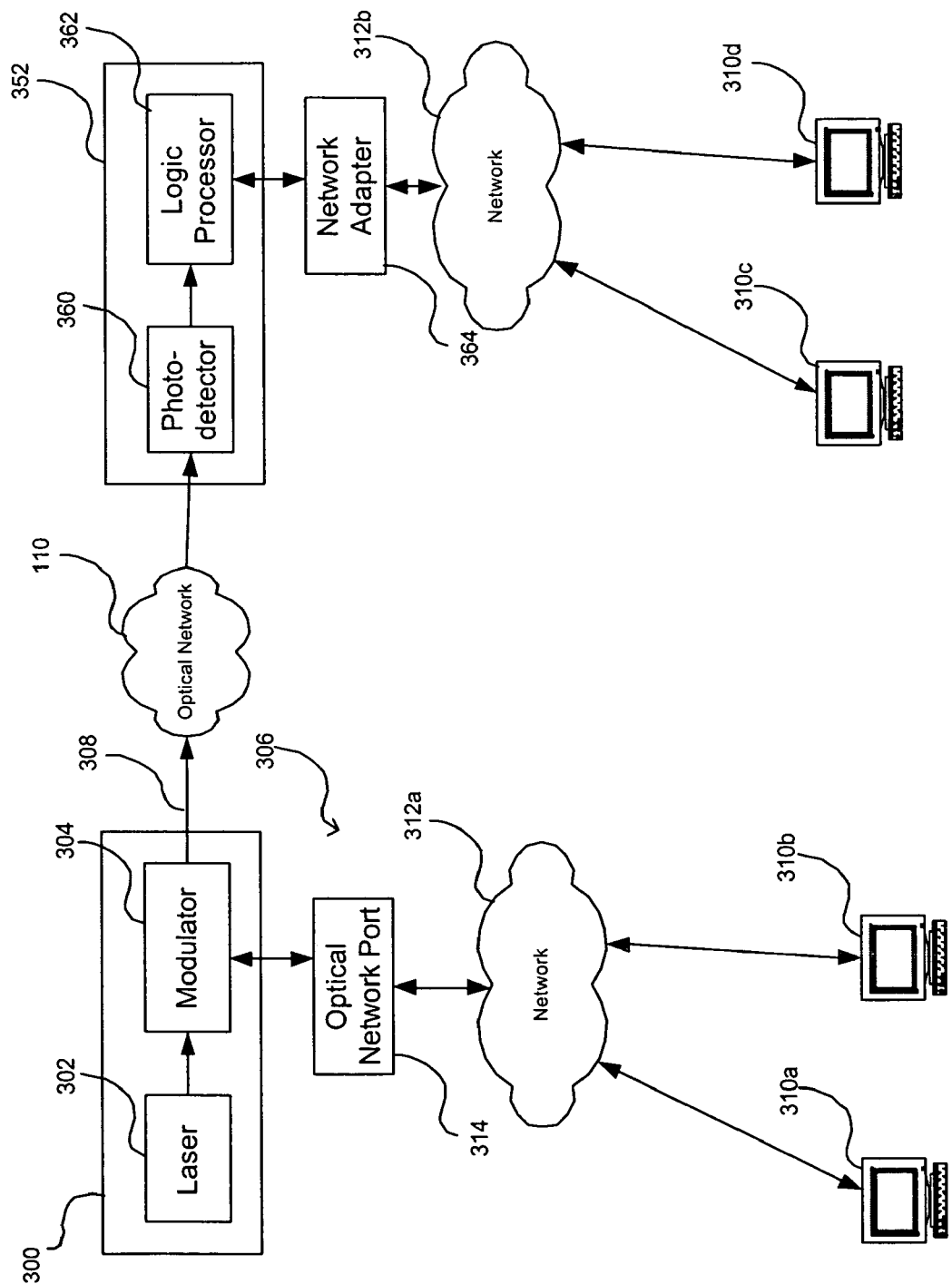
FIG. 9 illustrates an embodiment of a system utilizing the optical network of FIG. 5.

FIG. 5 shows one example of an optical network 110 in which an optical networking device such as the device 100 may be utilized. The network 110 includes a plurality of transmitter (TX) devices 300a, 300b . . . 300n. One example of a transmitter 300 is shown in FIG. 9 to include a light source such as a laser 302, the output of which is modulated by a modulator 304 with data from a data source 306, to provide an output signal 308 carrying data on a wavelength or band of wavelengths, to an optical network such as the optical network 110 of FIG. 5. In the illustrated embodiment, the data source 306 includes one or more computers 310a, 310b coupled by a network 312a to an optical network port 314 which provides a stream of data to the modulator 304 to be carried on the beam 308. The optical network port 314 and the computers 310a, 310b may be any type of computer or processing device including desktops, laptops, servers, personal data assistants, workstations, logic circuits, source of audio or video digital information, etc. The network 312a may be any type of network including the Internet, wide area network (WAN), local area network (LAN), wireless network, optical network, etc.

As shown in FIG. 5, the output signals 308 of each transmitter 308a, 308b . . . 308n provides a plurality of optical signals which may be carried on wavelengths $\lambda 1$, $\lambda 2$ . . . $\lambda n$, and may be input into an optical networking device 320 which may be similar to the device 100. In the illustrated embodiment, the device 320 is an AWG utilized as a multiplexer to combine the various optical signals carried by the wavelengths $\lambda 1$, $\lambda 2$ . . . $\lambda n$ into a multiplexed beam. One or more amplifiers 324 may amplify the multiplexed beam which may be transmitted over fiber optic cable 326 to the device 100 which in this embodiment, is utilized as a demultiplexer.

The device 100 extracts the component wavelengths $\lambda 1$, $\lambda 2$ . . . $\lambda n$ and outputs these component optical signals to an optical cross-connect device 330 in the illustrated embodiment. Additional optical signals from transmitters 332a, 332b may be coupled by fiber optic cables or other waveguides to be added to the inputs of the device 100 and output to the cross-connect device 330. Selected outputs of the cross-connect device 330 may be combined by a multiplexer device 340 and output to another fiber optic cable 342, the output of which is coupled by various other devices represented by a device 344 to a demultiplexer device 350 which may be similar to the device 100. Other outputs of the cross-connect device 330 may be routed by the multiplexer device 340 to a plurality of receivers 352a, 352b. It is appreciated that in some optical networks, one or more types of devices such as multiplexers 340, cross-connects 330 or demultiplexers 350 may be omitted, depending upon the particular application.

The device 350 extracts the component optical signals from the fiber optic cable 342 and outputs each component optical signal on a separate output channel to one of a plurality of receivers 352c . . . 352n. As shown in FIG. 9, each receiver 352 may include a photodetector 360 which converts the received optical signal to electrical signals which may be processed as data by a logic processor 362. The data may be output via a network adapter 364 and a network 312b to a plurality of computers 310c, 310d. The logic processor 362, network adapter 364 and the computers 310c, 310d may be any type of computer or data processor including desktops, laptops, servers, personal data assistants, workstations, source of audio or video digital information, etc. The network 312b may be any type of network including the Internet, wide area network (WAN), local area network (LAN), wireless network, optical network, etc.

Additional Embodiment Details

The illustrated operations of FIG. 4 shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   passing a plurality of light beams though an array of waveguides wherein at least one waveguide is coupled to a first test structure which exhibits an insertion loss dependent on a known polarization;
   measuring for at least one of a first plurality of adjacent waveguides of said array including said one waveguide, a first wavelength response associated with a first polarization, and a second wavelength response associated with a second polarization;
   identifying said first polarization as said known polarization if the peak value of said first wavelength response of said first test structure is less than the peak value of said second wavelength response of said first test structure;
   identifying said second polarization as said known polarization if the peak value of said second wavelength response of said first test structure is less than the peak value of said first wavelength response of said first test structure; and
   indicating one of said first and second polarizations as said known polarization in accordance with the polarization of said first and second polarizations which is identified as said known polarization.

2. The method of claim 1 wherein said array of waveguides includes a second waveguide coupled to a second test structure which exhibits an insertion loss dependent on a known polarization said method further comprising:
   measuring for at least one of a second plurality of adjacent waveguides of said array including said second waveguide, a first wavelength response associated with said first polarization, and a second wavelength response associated with said second polarization;
   identifying said first polarization of said first wavelength response of said second plurality of waveguides as said known polarization of said second test structure if the peak value of said first wavelength response of said second test structure is less than the peak value of said second wavelength response of said second test structure; and
   identifying said second polarization of said second wavelength response of said second plurality of waveguides as said known polarization of said second test structure if the peak value of said second wavelength response of said second test structure is less than the peak value of said first wavelength response of said second test structure.

3. The method of claim 1 wherein said array of waveguides is a part of an arrayed waveguide grating (AWG).

4. The method of claim 1 wherein said AWG is a planar lightwave circuit (PLC).

5. The method of claim 4 wherein said first test structure includes a directional coupler.

6. The method of claim 4 wherein said first test structure includes an interferometer.

7. The method of claim 4 wherein said known polarization is transverse electric (TE).

8. The method of claim 4 wherein said known polarization is transverse magnetic (TM).

9. A device, comprising:
   a first test structure which exhibits an insertion loss dependent on a known polarization; and
   an array of waveguides wherein at least one waveguide is coupled to said first test structure, wherein said array includes a first plurality of adjacent waveguides of said array including said one waveguide, at least one waveguide of said first plurality having a first wavelength response associated with a first polarization, and a second wavelength response associated with a second polarization, and wherein said first polarization is said known polarization if the peak value of said first wavelength response of said first test structure is less than the peak value of said second wavelength response of said first test structure; and said second polarization is said known polarization if the peak value of said second wavelength response of said first test structure is less than the peak value of said first wavelength response of said first test structure.

10. The device of claim 9 further comprising:
    a second test structure which exhibits an insertion loss dependent on a known polarization;
    wherein said array of waveguides includes a second waveguide coupled to said second test structure, wherein said array includes a second plurality of adjacent waveguides including said second waveguide, at least one waveguide of said second plurality having a first wavelength response associated with said first polarization, and a second wavelength response associated with said second polarization, and wherein said first polarization of said first wavelength response of said second plurality of waveguides is said known polarization of said second test structure if the peak value of said first wavelength response of said second test structure is less than the peak value of said second wavelength response of said second test structure; and said second polarization of said second wavelength response of said second plurality of waveguides is said known polarization of said second test structure if the peak value of said second wavelength response of said second test structure is less than the peak value of said first wavelength response of said second test structure.

11. The device of claim 9 further comprising an arrayed waveguide grating (AWG) which includes said array of waveguides.

12. The device of claim 11 wherein said AWG is a planar lightwave circuit (PLC).

13. The device of claim 12 wherein said first test structure includes a directional coupler.

14. The device of claim 12 wherein said first test structure includes an interferometer.

15. The device of claim 12 wherein said known polarization is transverse electric (TE).

16. The device of claim 12 wherein said known polarization is transverse magnetic (TM).

17. A system, comprising:
a device having a first test structure which exhibits an insertion loss dependent on a known polarization; and an array of waveguides wherein at least one waveguide is coupled to said first test structure, wherein said array includes a first plurality of adjacent waveguides of said array including said one waveguide;
apparatus coupled to said device and adapted to:
pass a plurality of light beams though said array of waveguides;
measure for at least one of a first plurality of adjacent waveguides of said array including said one waveguide, a first wavelength response associated with a first polarization, and a second wavelength response associated with a second polarization;
identify said first polarization as said known polarization if the peak value of said first wavelength response of said first test structure is less than the peak value of said second wavelength response of said first test structure; and
identify said second polarization as said known polarization if the peak value of said second wavelength response of said first test structure is less than the peak value of said first wavelength response of said first test structure.

18. The system of claim 17 wherein said device further comprises:
a second test structure which exhibits an insertion loss dependent on a known polarization; and wherein said array of waveguides includes a second waveguide coupled to said second test structure, wherein said array includes a second plurality of adjacent waveguides including said second waveguide, at least one waveguide of said second plurality having a first wavelength response associated with said first polarization, and a second wavelength response associated with said second polarization; and
wherein said apparatus is further adapted to:
measure for at least one of said second plurality of adjacent waveguides of said array including said second waveguide, a first wavelength response associated with said first polarization, and a second wavelength response associated with said second polarization;
identify said first polarization of said first wavelength response of said second plurality of waveguides as said known polarization of said second test structure if the peak value of said first wavelength response of said second test structure is less than the peak value of said second wavelength response of said second test structure; and
identify said second polarization of said second wavelength response of said second plurality of waveguides as said known polarization of said second test structure if the peak value of said second wavelength response of said second test structure is less than the peak value of said first wavelength response of said second test structure.

19. The system of claim 17 wherein said device is an arrayed waveguide grating (AWG) which includes said array of waveguides.

20. The system of claim 19 wherein said AWG is a planar lightwave circuit (PLC).

21. The system of claim 20 wherein said first test structure includes a directional coupler.

22. The system of claim 20 wherein said first test structure includes an interferometer.

23. The system of claim 20 wherein said known polarization is transverse electric (TE).

24. The system of claim 20 wherein said known polarization is transverse magnetic (TM).

25. A system for use with a fiber optic cable, comprising:
a multiplexer adapted to be optically coupled to a fiber optic cable; and
a demultiplexer adapted to be optically coupled to a fiber optic cable;
wherein at least one of said multiplexer and demultiplexer include a first test structure which exhibits an insertion loss dependent on a known polarization; and an array of waveguides wherein at least one waveguide is coupled to said first test structure, wherein said array includes a first plurality of adjacent waveguides of said array including said one waveguide, at least one waveguide of said first plurality having a first wavelength response associated with a first polarization, and a second wavelength response associated with a second polarization, and wherein said first polarization is said known polarization if the peak value of said first wavelength response of said first test structure is less than the peak value of said second wavelength response of said first test structure; and said second polarization is said known polarization if the peak value of said second wavelength response of said first test structure is less than the peak value of said first wavelength response of said first test structure.

26. The system of claim 25 wherein said at least one of said multiplexer and demultiplexer further includes a second test structure which exhibits an insertion loss dependent on a known polarization;
wherein said array of waveguides includes a second waveguide coupled to said second test structure, wherein said array includes a second plurality of adjacent waveguides including said second waveguide, at least one waveguide of said second plurality having a first wavelength response associated with said first polarization, and a second wavelength response associated with said second polarization, and wherein said first polarization of said first wavelength response of said second plurality of waveguides is said known polarization of said second test structure if the peak value of said first wavelength response of said second test structure is less than the peak value of said second wavelength response of said second test structure; and said second polarization of said second wavelength response of said second plurality of waveguides is said known polarization of said second test structure if the peak value of said second wavelength response of said second test structure is less than the peak value of said first wavelength response of said second test structure.

27. The system of claim 25 wherein said at least one of said multiplexer and demultiplexer further includes an arrayed waveguide grating (AWG) which includes said array of waveguides.

28. The system of claim 27 wherein said AWG is a planar lightwave circuit (PLC).

29. The system of claim 28 wherein said first test structure includes a directional coupler.

30. The system of claim 28 wherein said first test structure includes an interferometer.

31. The system of claim 28 wherein said known polarization is transverse electric (TE).

32. The system of claim 28 wherein said known polarization is transverse magnetic (TM).

* * * * *

UNITED STATES PATENT AND TRADEMARK OFFICE
CERTIFICATE OF CORRECTION

| | | |
|---|---|---|
| PATENT NO. | : 7,312,858 B2 | Page 1 of 1 |
| APPLICATION NO. | : 11/024264 | |
| DATED | : December 25, 2007 | |
| INVENTOR(S) | : Ken G. Purchase | |

It is certified that error appears in the above-identified patent and that said Letters Patent is hereby corrected as shown below:

Col. 10, Line 23, delete "claim 1" and replace with --claim 3--.

Signed and Sealed this
First Day of March, 2011

David J. Kappos
*Director of the United States Patent and Trademark Office*